United States Patent [19]

Lee

[11] Patent Number: 5,369,448
[45] Date of Patent: Nov. 29, 1994

[54] VIDEO SIGNAL PROCESSING SYSTEM REMOVING REDUNDANT INFORMATION FROM CHROMA/MOTION SEPARATION OUTPUT

[75] Inventor: Sang-rak Lee, Anyang, Rep. of Korea

[73] Assignee: Samsung Electronics Co., Ltd., Kyungki, Rep. of Korea

[21] Appl. No.: 18,596

[22] Filed: Feb. 17, 1993

[30] Foreign Application Priority Data

Feb. 17, 1992 [KR] Rep. of Korea .................... 92-2332

[51] Int. Cl.$^5$ .................... H04N 9/64; H04N 9/79
[52] U.S. Cl. .................... 348/668; 348/630; 348/711; 358/310; 358/330
[58] Field of Search ............ 358/36, 37, 40, 310, 358/330, 335, 336, 340, 23, 21 R, 31, 38; 348/668, 713, 630, 624, 711; H04N 9/64, 9/79, 5/91

[56] References Cited

U.S. PATENT DOCUMENTS

| | | | |
|---|---|---|---|
| 4,550,340 | 10/1985 | Nicholson et al. | 358/36 |
| 4,941,055 | 7/1990 | Fujimoto | 358/330 |
| 5,113,262 | 5/1985 | Strolle et al. | 358/10 |
| 5,161,030 | 11/1992 | Song | 358/330 |
| 5,227,879 | 7/1993 | Morita et al. | 358/12 |

*Primary Examiner*—Mark R. Powell
*Assistant Examiner*—Jeffrey S. Murrell
*Attorney, Agent, or Firm*—Sughrue, Mion, Zinn, Macpeak & Seas

[57] ABSTRACT

A video signal processing system including a reproducing or receiving circuit which is responsive to a recorded or transmitted video signal having a motion signal modulated at a first frequency mixed with a chroma signal modulated at a second frequency, wherein the reproducing or receiving circuit includes a chroma/motion C/M separating circuit for separating the motion signal from the chroma signal, and a vertical low-pass filter for passing vertical low frequency components and removing vertical high frequency components to eliminate redundant components existing in the vertical high frequency component of the video signal. The system can be adapted to any video system which carries out three-dimensional video processing, using a motion signal, to enhance high resolution.

4 Claims, 5 Drawing Sheets

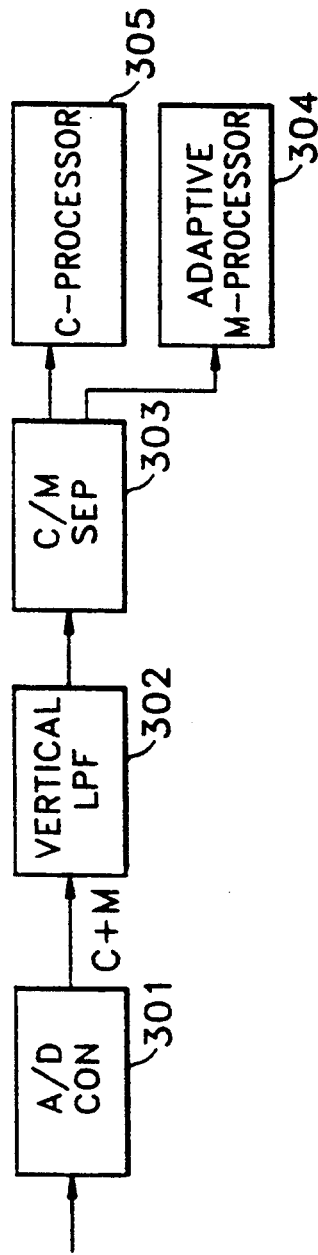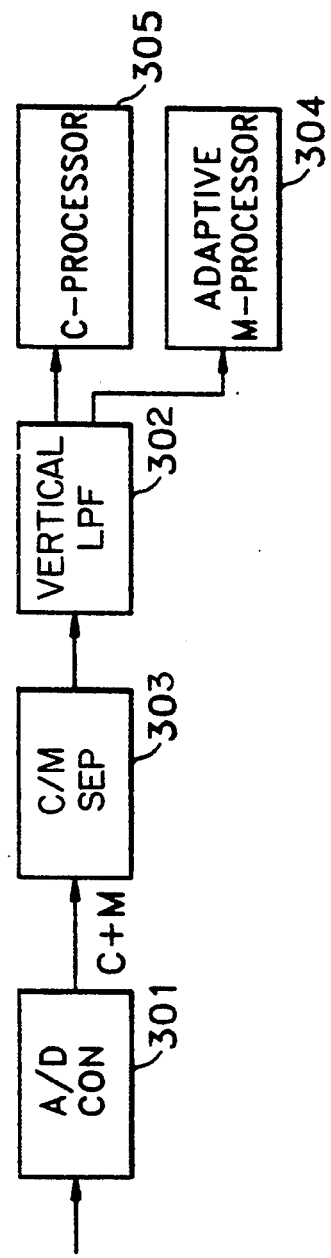

ODD FIELD

| LINE | | | |
|---|---|---|---|
| 1 | 0 | 0 | 0 |
| 2 | 180 | 270 | 90 |
| 3 | 0 | 180 | 180 |
| 4 | 180 | 90 | 270 |
| 5 | 0 | 0 | 0 |

EVEN FIELD

| LINE | | | |
|---|---|---|---|
| 1 | 180 | 90 | 270 |
| 2 | 0 | 180 | 180 |
| 3 | 180 | 270 | 90 |
| 4 | 0 | 0 | 0 |

— PHASE OF MOTION CARRIER Fm
— PHASE OF LOW PASS CONVERTED Fc
PHASE OF NTSC COLOR CARRIER

VIDEO SIGNAL PROCESSING SYSTEM REMOVING REDUNDANT INFORMATION FROM CHROMA/MOTION SEPARATION OUTPUT

BACKGROUND OF THE INVENTION

The present invention relates to a multi-dimensional video signal processing system. More particularly, the present invention relates to a video signal processing system in which a video signal having a motion signal recorded or transmitted with a chroma signal is reproduced or received by a reproducing or receiving circuit that includes a separator for separating the motion signal from the chroma signal and a vertical low-pass filter for removing redundant components of the separated signal from the video signal.

In a conventional video signal processing system, during the reproduction of a previously recorded video signal or the reception of a previously transmitted video signal, a C/M separator is employed to separate from the video signal a motion signal and a chroma signal. In a graph of XY coordinates (having first through fourth quadrants with the horizontal frequency as the X-axis and the vertical frequency as the Y-axis) in which spectral components of the video signal are plotted in first through fourth quadrants of the graph, such a conventional C/M separator allows spectral components of the video signal to pass second and fourth quadrants. However, in the spectral distribution of a recorded or a transmitted video signal of one field, the spectral components of the separated chroma and motion signals also appear in the second and fourth quadrants. That is, the primary or principal components of the motion and chroma signals appear in the low vertical frequency area, while redundant components thereof appear in the high vertical frequency area. Accordingly, by separating the motion and chroma signals from each other using the C/M separator, the redundant components, which appear in the high vertical frequency area, are not separated. As a result, the redundant components interfere with the video signal due to the unseparated motion and chroma signal components thereby degrading the reproduced picture quality.

SUMMARY OF THE INVENTION

Accordingly, it is the object of the present invention to provide a video signal processing system capable of improving the reproduced picture quality by eliminating redundant components which cannot be separated by a C/M separator when separating motion and chroma signals.

To achieve the above and other objects and advantages, the present invention provides a video signal processing system for reproducing or receiving a recorded or transmitted video signal having a motion signal modulated at a first frequency mixed with a chroma signal modulated at a second frequency, the system including a C/M separating circuit for separating from the video signal the motion signal from the chroma signal, and a vertical low-pass filter for passing vertical low frequency components and removing vertical high frequency components to eliminate redundant components existing in the vertical high frequency component of the video signal.

In further accordance with the above objects, the present invention provides a video signal processing system which includes a recording or transmitting circuit and a reproducing or receiving circuit. The recording or transmitting circuit includes a motion detecting circuit for detecting motion within a video signal and outputting a corresponding motion signal, a first 4-phase modulator for modulating the motion signal at a first predetermined frequency and outputting a corresponding modulated motion signal, a second 4-phase modulator for modulating a chroma signal at a second predetermined frequency and outputting a corresponding modulated chroma signal, and an adder for combing the modulated motion signal with the modulated chroma signal into a composite video signal, and the reproducing or receiving circuit, which is responsive to the composite video signal, includes a C/M separating circuit for separating from the composite video signal the motion signal from the chroma signal, and a vertical low-pass filter for passing vertical low frequency components and removing vertical high frequency components to eliminate redundant components existing in the vertical high frequency component of the video signal.

BRIEF DESCRIPTION OF THE DRAWINGS

The above and other objects and advantages of the present invention will become more apparent by describing in detail a preferred embodiment thereof with reference to the attached drawings in which:

FIGS. 2a and 2b are block diagrams of a reproducing or receiving circuit in a video signal processing system according to the present invention;

DETAILED DESCRIPTION OF A PREFERRED EMBODIMENT

Figure 1:
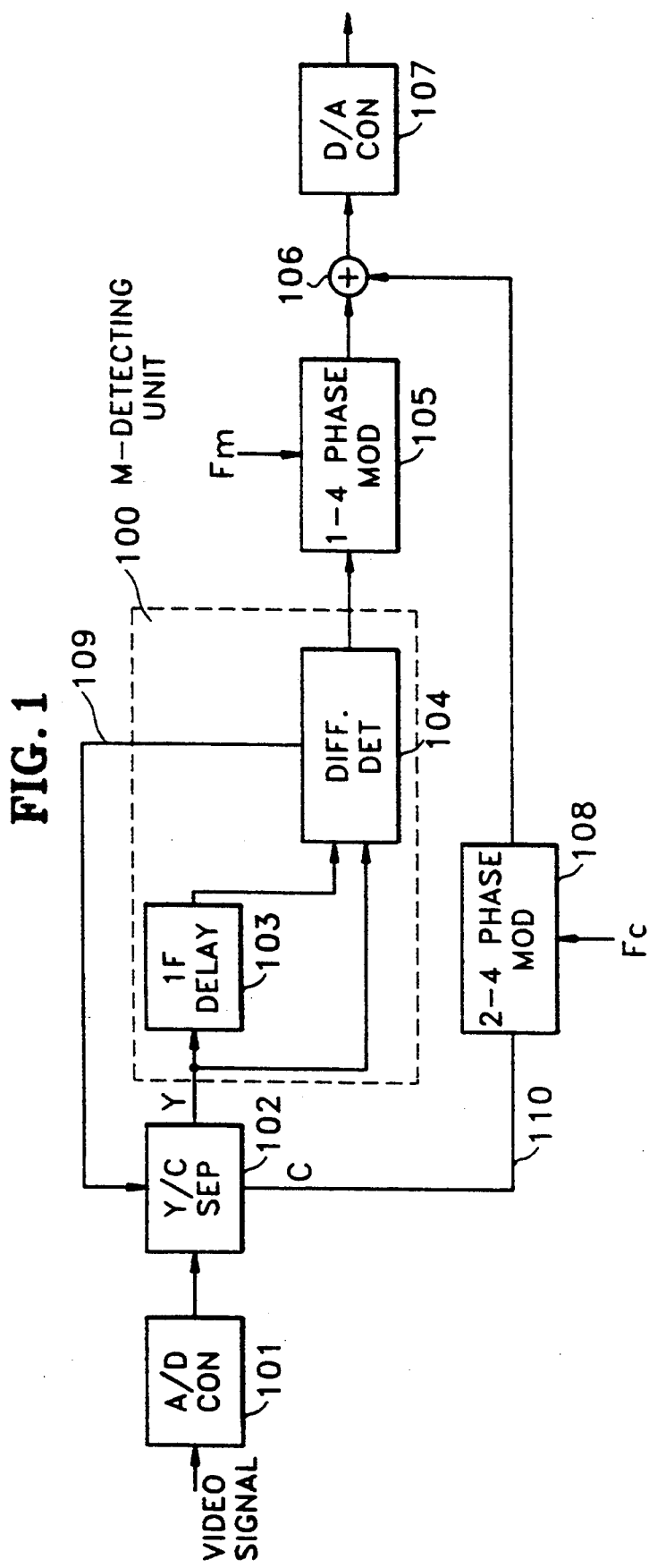
FIG. 1 is a block diagram of a recording or transmitting circuit in a video signal processing system according to the present invention.

FIG. 1 is a block diagram of a recording or transmitting circuit in a video signal processing system according to the present invention. The circuit includes an A/D converter 101, a Y/C separator 102, a motion detecting unit 100, first and second 4-phase modulators 105 and 108, an adder 106, and a D/A converter 107. The motion detecting unit 100 includes a one-frame delay 103 and a difference signal detector 104.

In operation, the A/D converter 10 1 receives an original analog video signal and converts it into a digital video signal. The digital signal is then applied to the Y/C separator 102 which separates the digital signal into a chroma signal C, which is supplied to the second 4-phase modulator 108, and a luma signal Y, which is output to the motion signal detecting unit 100. The Y/C separator 102, which is of conventional design, uses a motion signal as a reference signal for separating the chroma and luma signals. In this case, the motion signal is fed back from the motion signal detecting unit 100 via a signal line 109 to the Y/C separator 102.

The motion signal detecting unit 100, which in response to the luma signal Y from the Y/C separator 102, detects a difference in the luma signal and generates the motion signal. Thus, the motion signal represents the changes or difference of an image included in the video signal. In other words, the motion signal is a difference signal obtained from consecutive video signals, and represents the difference of consecutive frames. The motion signal detecting unit 100 includes the one-frame delay 103 for delaying the input luma signal Y by one frame and outputs a corresponding delayed signal to the difference signal detector 104. The difference signal detector 104 inputs both the one-frame delayed luma signal and the luma signal directly supplied from the Y/C separator 102, and generates a difference signal by performing an exclusive-OR operation on the two input signals.

The motion signal is also supplied to the 4-phase modulator 105, which performs four-phase modulation with respect to the motion signal using a first carrier Fm. The motion signal is modulated and classified into odd and even number data lines, which are respectively multiplied by sine and cosine waves. The resultant products are then summed and thus the four-phase modulated output signal, which has a 90° phase difference when the input luma signal changes after one bit of processing, is applied to the adder 106.

Similarly, the 4-phase modulator 108 executes four-phase modulation with respect to the chroma signal C from the Y/C separator 102 using a second carrier Fc, whose frequency has a different phase than the first carder Fm.

The adder 106 sums the outputs from the 4-phase modulators 105 and 108, and supplies the resultant sum to the D/A converter 107, which converts the sum into an analog signal for subsequent recording or transmitting. Since the two four-phase modulated output signals are modulated, using carriers having difference frequencies, their characteristics remain unaffected after they are added together by the adder 106.

FIGS. 2a and 2b each illustrates a block diagram of a reproducing or receiving circuit of the present invention, and includes an A/D converter 301, a vertical low-pass filter 302, a C/M separator 303, an adaptive motion signal processor 304, and a chroma signal processor 305.

In operation, an analog signal after being either recorded or transmitted is applied to the circuit of FIGS. 2 for reproducing the recorded signal or receiving the transmitted signal. The signal is converted by the A/D converter 301 to a digital signal C+M, which includes a chroma signal mixed with a motion signal.

In FIG. 2a, the converted signal C+M is input to a vertical low-pass filter 302, which passes only the vertical low-pass frequency components in the digital signal C+M from the A/D converter 301, and which cuts off the remaining components. This process is carried out to eliminate redundant components in the chroma and motion signals appearing in the vertical high-pass frequency portion of the signal C+M. The signal from the vertical low-pass filter 302 is supplied to the C/M separator 303 which thus performs the same operation as that of a conventional separator. More specifically, when the spectrum of the input signal is represented on a plane of coordinates defined by setting the horizontal frequency as the X-axis, and the vertical frequency as the Y-axis, the C/M separator 303 outputs only the components in the second and fourth quadrants. In a falter having such characteristics, since the respective spectral positions of the chroma and motion signals in the video signal change in accordance with the odd and even fields, the chroma signal is always detected in the odd field and the motion signal is always detected in the even field.

On the other hand, the same effect is obtained even if the vertical low-pass filter 302 and the C/M separator 303 are reversed in position as shown in FIG. 2b. In other words, even if the C/M separator 303 is connected to the output of the A/D converter 301 and the vertical low-pass filter 302 is connected to the output of the C/M separator, the same results as above will be obtained.

In either situation, the video signal, which is separated into the motion signal and the chroma signal, is respectively supplied to the chroma signal processor 305 and the adaptive motion signal processor 304. The chroma signal processor 305 and the adaptive motion signal processor 304 process the video signal in accordance with conventional video signal processing techniques.

Figures 3A, 3B, 5:
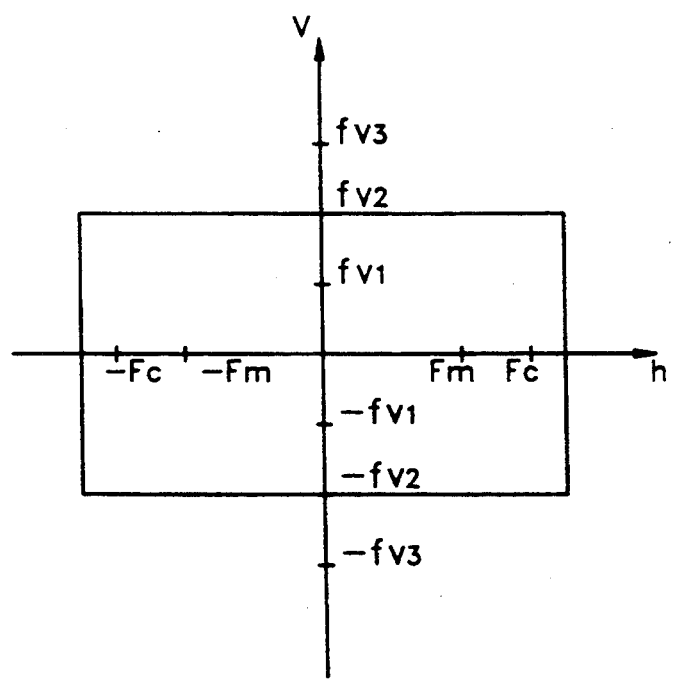
FIGS. 3a and 3b illustrate phases of carriers in respective fields of a video signal.
FIG. 5 is a graphical representation showing the passband of a vertical low-pass filter.

FIGS. 3a and 3b illustrate the phases of the carriers for the chroma and motion signals in each field and line when executing the four-phase modulation as described above and as shown in FIG. 1.

First, referring to the odd field portion in FIG. 3a, when the phase of the input video signal is shifted in the sequence of 0°, 180°, 0°, and 180°, the phase of the second carrier Fc, which is four-phase modulated in accordance with the chroma signal, is shifted in the sequence of 0°, 270°, 180° and 90°, while the phase of first carrier Fm, which is four-phase modulated in accordance with the motion signal, is shifted in the sequence of 0°, 90°, 180° and 270°. That is, the phase of first carrier Fm is shifted clockwise, and the phase of the second carrier Fc is shifted counterclockwise.

On the other hand, referring to the even field shown in FIG. 3b, the phase of the input video signal is shifted in the sequence of 180°, 0°, 180° and 0° unlike the odd field. Thus, the phases of the first carrier Fm and the second carrier Fc, being respectively four-phase modulated in accordance with the chroma and motion signals, are respectively shifted different from that in the odd field. That is, the phase of the second carder Fc, which is four-phase modulated in accordance with the chroma signal, is shifted in the sequence of 90°, 180°, 270°, and 0°, and the phase of the first carder Fm, which is four-phase modulated in accordance with the motion signal, is shifted in the sequence of 270°, 180°, 90° and 0°.

Figure 4A:
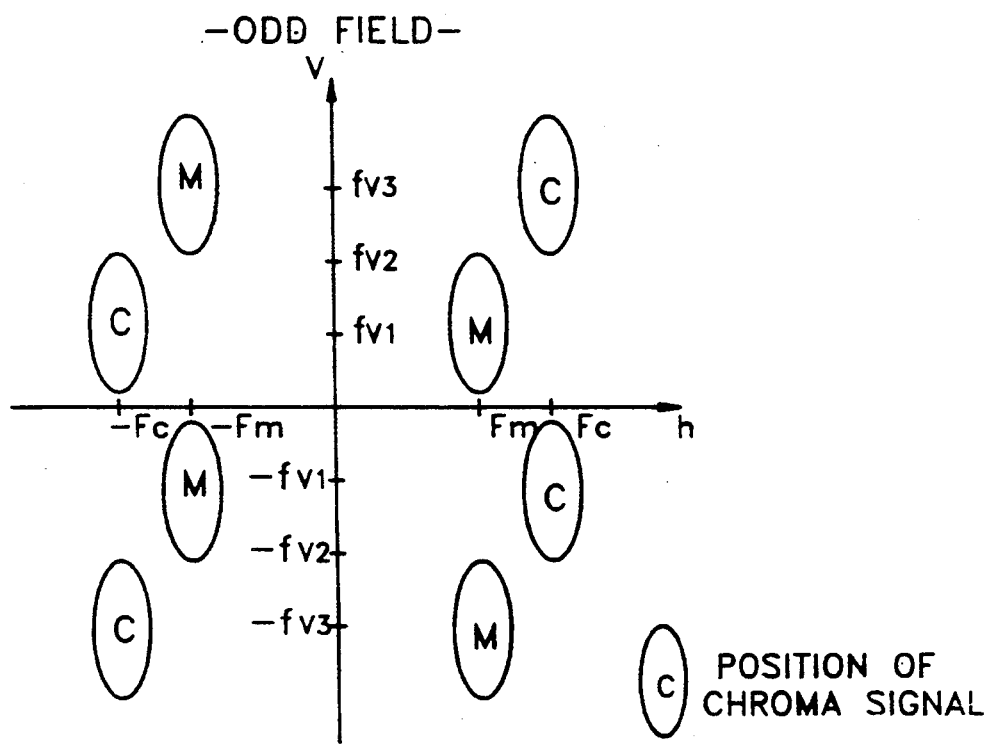
FIGS. 4a and 4b are graphical representations showing the spectrum positions of chroma and motion signals.
Figure 4B:
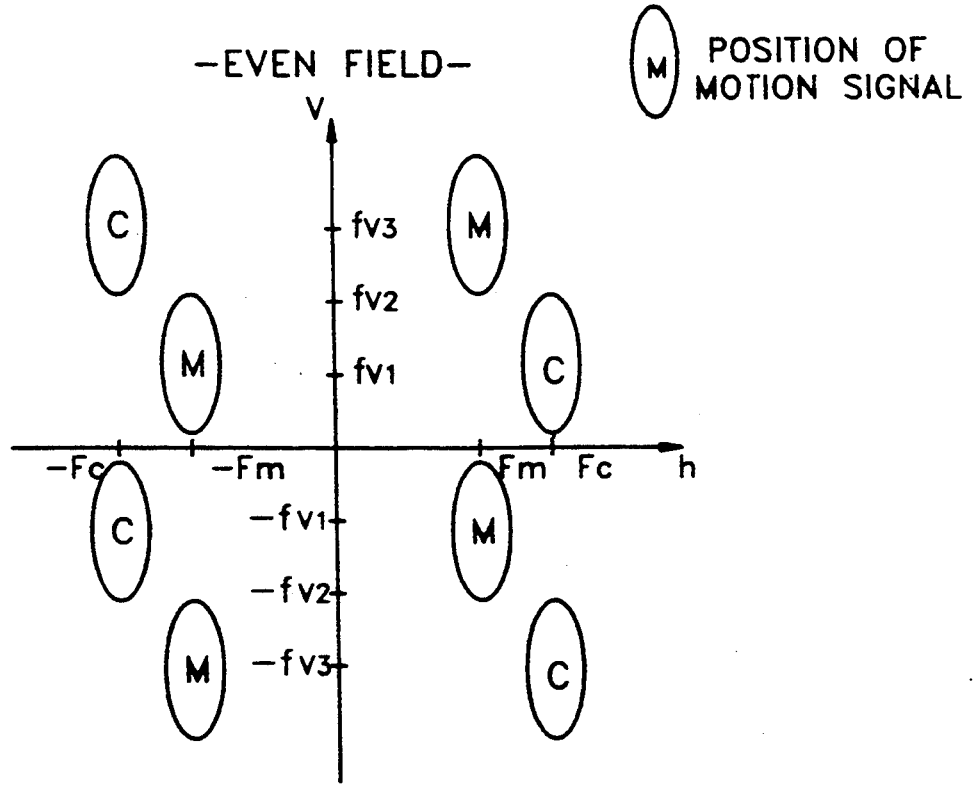

FIGS. 4a and 4b illustrate the frequency spectrums of the chroma and motion signals of the recorded or transmitted signal for the odd and even fields, respectively, and shows that the spectral positions of the chroma and motion signals are symmetrical with each other in the odd and even fields.

In the odd field, the primary or principal components of the chroma signal appear in the vertical low-pass area of the second and fourth quadrants, and the redundant components of the motion signal appear in the vertical high-pass area. In the even field, the principal components of the motion signal appear in the vertical low-pass area of the second and fourth quadrants, and the redundant components of the chroma signal appear in the vertical high-pass area. Consequently, if the signal is separated into chroma and motion signals by a conventional C/M separator as described above, the redundant components disposed in the portion fv3 (e.g., 525×⅔ when the signal is of the NTSC system) cannot be separated.

Figure 6:
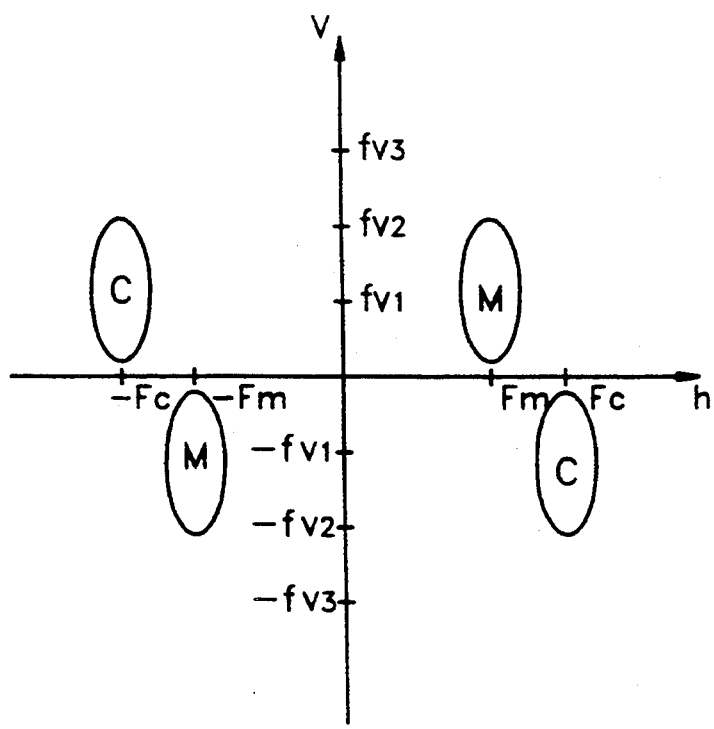
FIG. 6 is a graphical representation showing the spectrum positions of signals output from the vertical low-pass filter.

Accordingly, the vertical low-pass filter 302, which is a comb filter and which has the passing characteristics as shown in FIG. 5, is employed for eliminating the redundant components of the chroma and motion signals appearing in the vertical high-pass area thereby improving the characteristics of the separated chroma and motion signals. FIG. 5 represents the passing characteristics of the vertical low-pass filter in which only a portion of a small absolute value passes (i.e., those components within the box) with the vertical frequency axis as a reference. Accordingly, after the video signal is filtered by the vertical low-pass filter, the redundant components are removed. FIG. 6 represents the spectral positions of the video signal after having passed through the vertical low-pass filter.

Figure 7:
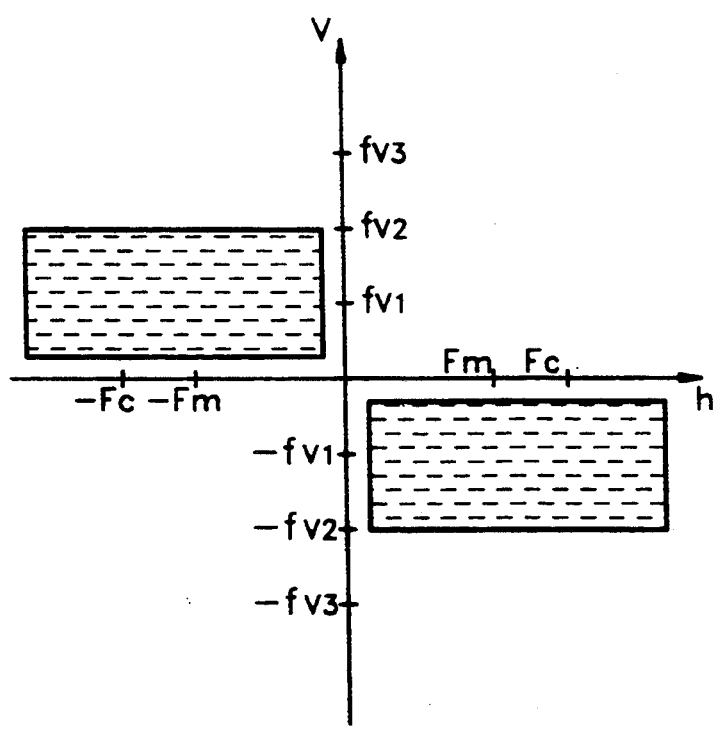
FIG. 7 is a graphical representation showing the passband of a C/M separator.

FIG. 7 represents the passband of the video signal after passing through the vertical low-pass filter and the C/M separator. Specifically, in the video signal whose spectral distribution is shown in FIG. 4, the chroma signal components are passed in the odd field, the motion signal components are passed in the even field, and the redundant components disposed in the vertical high-pass portion fv3 (525×⅔) are eliminated, so that degradation of the picture quality due to interference is prevented.

As described above, the present invention relates to video signal processing system in which a motion signal serves as a reference signal which performs three-dimensional video processing for attaining high resolution in various video apparatuses. Specifically, the motion and chroma signals are loaded on one channel and then separated without interfering with the video signal. Therefore, the present invention can be adopted in any video system which applies a motion signal.

While the present invention has been particularly shown and described with reference to a particular embodiment, it will be understood by those skilled in the art that various changes in form and details may be effected therein without departing from the spirit and scope of the invention, which is defined by the appended claims.

What is claimed is:

1. A video signal processing system for reproducing or receiving a recorded or transmitted video signal having a motion signal modulated at a first frequency mixed with a chroma signal modulated at a second frequency, said system comprising:
   a chroma/motion separating circuit for separating said video signal into said motion signal and said chroma signal; and
   a vertical low-pass filter for passing vertical low frequency components and removing vertical high frequency components to thereby eliminate redundant components existing in said vertical high frequency component of the video signal, wherein, in a graph having an X-axis corresponding to a horizontal frequency and a Y-axis corresponding to a vertical frequency and spectral positions of said video signal are represented on said graph, said chroma/motion separating circuit allowing only frequency components of the second and fourth quadrants to pass.

2. The video signal processing system as defined in claim 1, further comprising an A/D converter for converting said video signal into a digital signal and outputting said digital signal to said chroma/motion separating circuit, whose output is coupled to said vertical low-pass filter; a chroma signal processor, coupled to a first output of said vertical low-pass filter, for processing said chroma signal; and an adaptive motion signal processor, coupled to a second output of said vertical low-pass filter, for processing said motion signal.

3. The video signal processing system as defined in claim 1, further comprising:
   an A/D converter for converting said video signal into a digital signal and outputting said digital signal to said vertical low-pass filter, whose output is coupled to said chroma/motion separating circuit;
   a chroma signal processor, coupled to a first output of said chroma/motion separating circuit, for processing said chroma signal; and
   an adaptive motion signal processor, coupled to a second output of said chroma/motion separating circuit, for processing said motion signal.

4. A video signal processing system comprising:
   a recording or transmitting circuit comprising:
      a motion detecting circuit for detecting motion within a video signal and outputting a corresponding motion signal;
      a first 4-phase modulator for modulating said motion signal at a first predetermined frequency and outputting a corresponding modulated motion signal;
      a second 4-phase modulator for modulating a chroma signal at a second predetermined frequency and outputting a corresponding modulated chroma signal; and
      an adder for combing said modulated motion signal with said modulated chroma signal into a composite video signal; and
   a reproducing or receiving circuit responsive to said composite video signal comprising:
      a chroma/motion separating circuit for separating said composite video signal into said motion signal and said chroma signal; and
      a vertical low-pass filter for passing vertical low frequency components and removing vertical high frequency components, whereby redundant components existing in said vertical high frequency component of the video signal can be eliminated.

* * * * *